(12) United States Patent
Fujimaki (10) Patent No.: US 6,850,672 B2
(45) Date of Patent: Feb. 1, 2005

(54) OPTICAL WAVEGUIDE COUPLER AND ITS CHARACTERISTIC ADJUSTING METHOD

(76) Inventor: Makoto Fujimaki, #A101, 13-1, Inarimae, Tsukuba-shi, Ibaraki 305-0061 (JP)

( * ) Notice: Subject to any disclaimer, the term of this patent is extended or adjusted under 35 U.S.C. 154(b) by 227 days.

(21) Appl. No.: 10/307,793

(22) Filed: Dec. 2, 2002

(65) Prior Publication Data

US 2003/0118271 A1 Jun. 26, 2003

(30) Foreign Application Priority Data

Dec. 3, 2001 (JP) .................................. 2001-369224

(51) Int. Cl.[7] .............................................. G02B 6/26
(52) U.S. Cl. ........................................ 385/39; 385/15
(58) Field of Search .............................. 385/39, 42–45, 385/50

(56) References Cited

U.S. PATENT DOCUMENTS

| 4,904,040 A | * | 2/1990 | Takesue et al. ............... 385/50 |
| 5,427,970 A | * | 6/1995 | Hsue et al. .................. 438/261 |
| 5,463,705 A | * | 10/1995 | Clauberg et al. .............. 385/14 |

FOREIGN PATENT DOCUMENTS

| JP | 06222239 A | 8/1994 |
| JP | 06281837 A | 10/1994 |
| JP | 2000338358 A | 12/2000 |

OTHER PUBLICATIONS

Hiroshi Nishihara et al., *Optical Integrated Circuit*, published by Ohmsha, Mar. 25, 1998, pp. 44–47 (with English translation).

Hiroshi Nishihara, et al., *Optical Integrated Circuit*, published by Ohmsha, Mar. 25, 1998, pp. 185 (with English translation).

Makoto Fujimaki et al., *Ion–Implantation–Induced Densification in Silica–based Glass for Fabrication of Optical Fiber Gratings*, Journal of Applied Physics, vol. 88, No. 10, Nov. 15, 2000, pp. 5534–5537.

M. Verhaegen et al, *Photorefractive Waveguides Produced by Ion–Implantation of Fused Silica*, Nuclear Instruments and Methods in Physics Research, B 106, 1995, pp. 438–441.

O. V. Mazurin et al, "Physical Science Data 15," Handbook of Glass Data *Part A, Silica Glass and Binary Silicate Glasses*, published by Elsevier, 1983, pp. 260–271, 480–487, 550–555, 582–585, and 594–595.

* cited by examiner

Primary Examiner—Phan T. H. Palmer
Assistant Examiner—Jennifer Doan
(74) Attorney, Agent, or Firm—Workman Nydegger (57) ABSTRACT

The present invention provides methods that can adjust the coupling ratio of an optical waveguide coupler efficiently. The coupling ratio is adjusted by varying the propagation constants $\beta_a$ and $\beta_b$ and the coupling coefficient x of the coupling portion by varying the refractive index of the coupling portion by implanting accelerated ions into waveguide cores of the coupling portion, or into the claddings around the cores, of the coupler fabricated. This enables efficient adjustment of the coupling ratio of the optical waveguide coupler.

20 Claims, 4 Drawing Sheets

OPTICAL WAVEGUIDE COUPLER AND ITS CHARACTERISTIC ADJUSTING METHOD

This application claims priority from Japanese Patent Application No. 2001-369224 filed Dec. 3, 2001, which is incorporated hereinto by reference.

BACKGROUND OF THE INVENTION

1. Field of the Invention

The present invention relates to an optical waveguide coupler and its characteristic adjusting method.

2. Description of the Related Art

Figure 3:
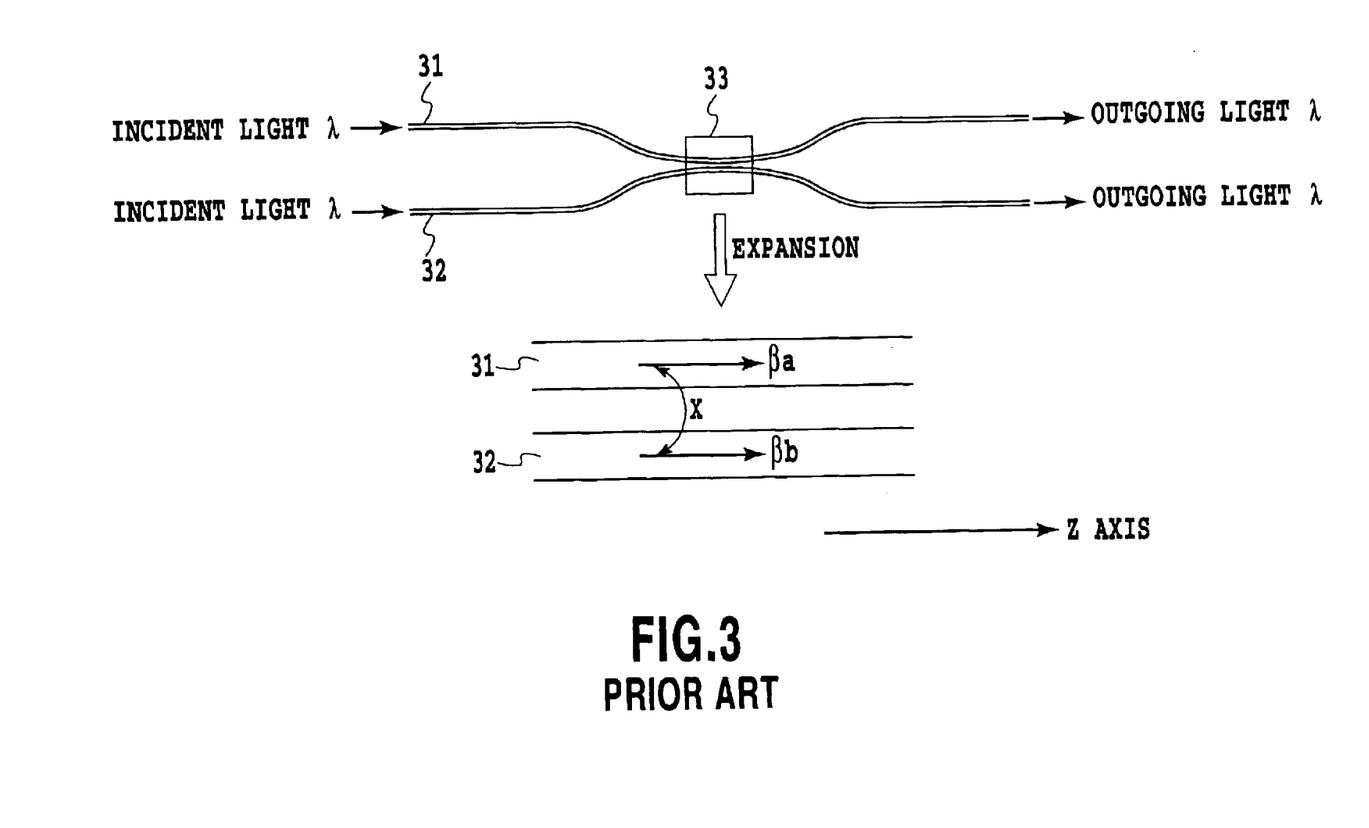
FIG. 3 is a schematic diagram showing a conventional optical waveguide coupler that exchanges optical power between first and second waveguides at a portion where the two waveguides are close to each other formed by placing part of the two waveguides of the optical waveguide coupler side by side in close proximity about five times the wavelength of transmitted light.

As shown in FIG. 3, an optical waveguide coupler (also called "directional coupler") that includes an optical fiber coupler and is formed in optical waveguides inclusive of optical fibers, planar optical waveguides, and semiconductor thin film optical waveguide, is a device for exchanging optical power between two waveguides in a coupling portion 33 that is formed by placing part of two independent waveguides, a first waveguide 31 and a second waveguide 32, side by side in close proximity about five times the wavelength of transmitted light (see, pp. 45–47 of Hiroshi Nisihara, Masamitsu Haruna, and Toshiaki Suhara, "Optical Integrated Circuit (revised and enlarged edition)", published by Ohmsha, Mar. 25, 1998).

Assume that the first waveguide 31 has a normal mode a, and the second waveguide 32 has a normal mode b, that the propagation constants of the two modes are $\beta_a$ and $\beta_b$, respectively, where $\beta_b \geq \beta_a$, and that the coupling coefficient of the two modes a and b is a coupling coefficient x in the coupling portion 33. When light with power 1 is incident onto the first waveguide 31, powers $P_I$ and $P_{II}$ of the outgoing light beams from the first waveguide 31 and second waveguide 32 are given by the following equations.

$$P_I = 1 - F \sin^2 \beta_c z \quad (1)$$

$$P_{II} = F \sin^2 \beta_c z \quad (2)$$

where z is the length of the coupling portion 33, and $$\beta_c = \sqrt{x^2 + \delta^2}, \quad (3)$$

$$\delta = (\beta_b - \beta_a)/2, \quad (4)$$

$$F = 1/[1 + (\delta/x)^2] \quad (5)$$

From these equations, the length of the coupling portion 33 that maximizes the $P_{II}$, that is, that gives the maximum transfer of the light power from the first waveguide 31 to the second waveguide 32, is given by the following equation.

$$z = \pi(2n-1)/2\beta_c \quad (6)$$

where n is an integer equal to or greater than one. The transfer rate of the power in this case is given by the foregoing F.

The coupling ratio, the most important characteristic of the optical waveguide coupler, is given by the ratio between the powers of the outgoing light beams from the two waveguides. As can be seen from the foregoing description, the coupling ratio is determined by the propagation constants $\beta_a$ and $\beta_b$ of the light beams in the two optical waveguides, the coupling coefficient x, and the length z of the coupling portion 33. For example, as for the coupler having the coupling portion 33 with the length $z = \pi/2\beta_c$, the coupling ratio is given by 1−F:F. Where $\beta_a = \beta_b$, the value F is given by F=1. This means that the entire light incident onto the first waveguide 31 is emitted from the second waveguide 32 if the length of the coupling portion 33 is $\pi/2\beta_c$.

As for fabrication methods of such a conventional optical fiber coupler, the following methods are known (see, Japanese Patent Application Laid-open Nos. 6-222239 (1994), 2000-338358, and 6-281837 (1994)). A first method heats part of two optical fibers that are placed in contact, and draws them along the direction of the length with application of heat, thereby fusing the two optical fibers with thinning them. A second method polishes a side of each optical fiber to get into D-shaped, and brings the polished surfaces of the two optical fibers into contact each other. Since these fabrication methods can make the coupler with monitoring its characteristics such as the coupling ratio, it can achieve desired coupler characteristics during the fabrication. Thus it is unnecessary for the fabrication methods to adjust the coupler characteristics after fabricating the coupler.

In contrast, as for the planar optical waveguide, it is fabricated as shown in FIGS. 4A–4E.

Figure 4A:
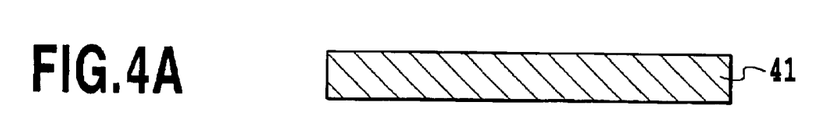
FIGS. 4A–4E are cross-sectional views showing a series of fabrication processes of an optical waveguide coupler composed of planar optical waveguides.
Figure 4B:
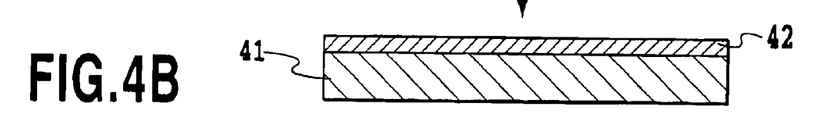
Figure 4C:
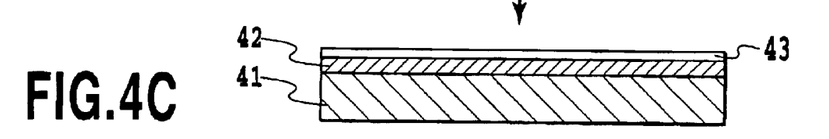
Figure 4D:
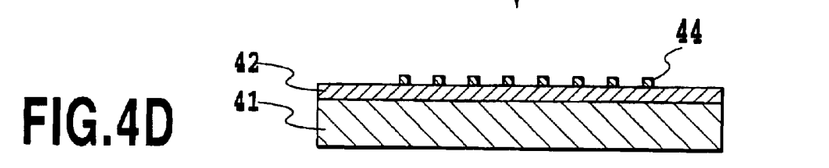
Figure 4E:
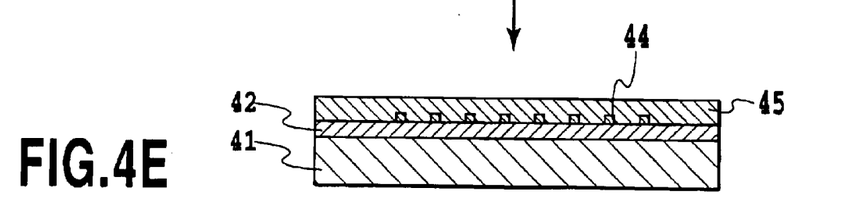

Preparing Si or $SiO_2$ substrate 41 (FIG. 4A);

Depositing a lower cladding 42 thereon (FIG. 4B);

Depositing a core layer 43 thereon (FIG. 4C);

Patterning a coupling portion (33 of FIG. 3) at the same time when forming the core layer 43 into a desired optical circuit pattern 44 (FIG. 4D); and Forming an upper cladding 45 by chemical vapor deposition method or flame hydrolysis deposition method (FIG. 4E).

As for the planar optical waveguide, the characteristic of the coupler can be measured only after completing the entire process because it cannot be monitored during forming the coupling portion. Accordingly, when any error occurs between the characteristics of the actually fabricated coupler and the desired characteristics, it becomes necessary to adjust the coupler characteristics after the fabrication.

SUMMARY OF THE INVENTION

The present invention is created to solve the foregoing problem of the conventional technique. It is therefore an object of the present invention to provide a method capable of efficiently adjusting the coupling ratio of the optical waveguide coupler.

To accomplish the foregoing objective, according to a first aspect of the present invention, there is provided a characteristic adjusting method of an optical waveguide coupler comprising the steps of generating accelerated ions, and adjusting a coupling ratio of the optical waveguide coupler by implanting the accelerated ions into a coupling portion of the optical waveguide coupler to vary refractive index of the coupling portion.

Here, it is preferable that the characteristic adjusting method further comprise the step of selecting, as a region in which the refractive index is varied by the ion implantation, at least one of components constituting the coupling portion that is composed of optical waveguide cores, a cladding sandwiched by the two optical waveguide cores and a cladding not sandwiched by the two optical waveguide cores.

It is preferable that the ion implantation be carried out by implanting ions of atoms whose atomic number is equal to or less than 36.

It is preferable that the ion implantation be carried out by implanting an ionic species including at least one of Ge ions, P ions, Ti ions, B ions and F ions that cause chemical bonds with silica glass resulting in the refractive index variation.

It is preferable that the optical waveguide coupler have the coupling portion composed of one of a semiconductor material, a ferroelectric material and a ferromagnetic material, and the ion implantation cause one of a density reduction of the material due to amorphization, a variation in a dielectric constant of the material and chemical bonds of the implanted ions with atoms in the material, resulting in the refractive index variation in a location to which the ions are implanted.

It is preferable that acceleration energy of the ions be fixed during the adjustment of the coupling ratio of the optical waveguide coupler.

It is preferable that acceleration energy of the ions be varied such that the ions are implanted to an entire longitudinal direction of the coupling portion of the optical waveguide coupler.

It is preferable that the ion implantation be carried out with preventing the ions from being implanted to regions other than a selected region by means of using a mask or focusing the ions.

It is preferable that one of the width of a slit of the mask and the size of ion focusing be determined considering a phenomenon that when the ions are implanted into a substance, they scatter and spread because of interaction with atoms in the substance.

It is preferable that the coupling ratio be adjusted by placing two optical waveguides close to each other in part at a distance that prevents a coupling, that is, by setting a coupling coefficient at zero, and by increasing the coupling coefficient by implanting the ions to the portion where the two optical waveguides are close to each other.

It is preferable that the optical waveguide coupler consist of one of a coupler formed in a planar optical waveguide and a coupler composed of optical fibers.

To accomplish the foregoing objective, according to a second aspect of the present invention, there is provided an optical waveguide coupler comprising a coupling portion whose coupling ratio is adjusted by varying a refractive index of the coupling portion by implanting accelerated ions into the coupling portion of the optical waveguide coupler.

It is preferable that the optical waveguide coupler in accordance with the present invention include the coupling portion whose coupling ratio is adjusted using one of the foregoing characteristic adjusting methods of an optical waveguide coupler.

According to the present invention, the coupling ratio is adjusted by varying the propagation constants $\beta_a$ and $\beta_b$, and the coupling coefficient x of the coupling portion by varying the refractive index of the coupling portion by implanting accelerated ions into waveguide cores of the coupling portion, or into the claddings around the cores, of the coupler fabricated. This enables efficient adjustment of the coupling ratio of the optical waveguide coupler.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The preferred embodiments of the optical waveguide coupler and its characteristic adjusting method in accordance with the present invention will now be described with reference to the accompanying drawings.

Figure 1:
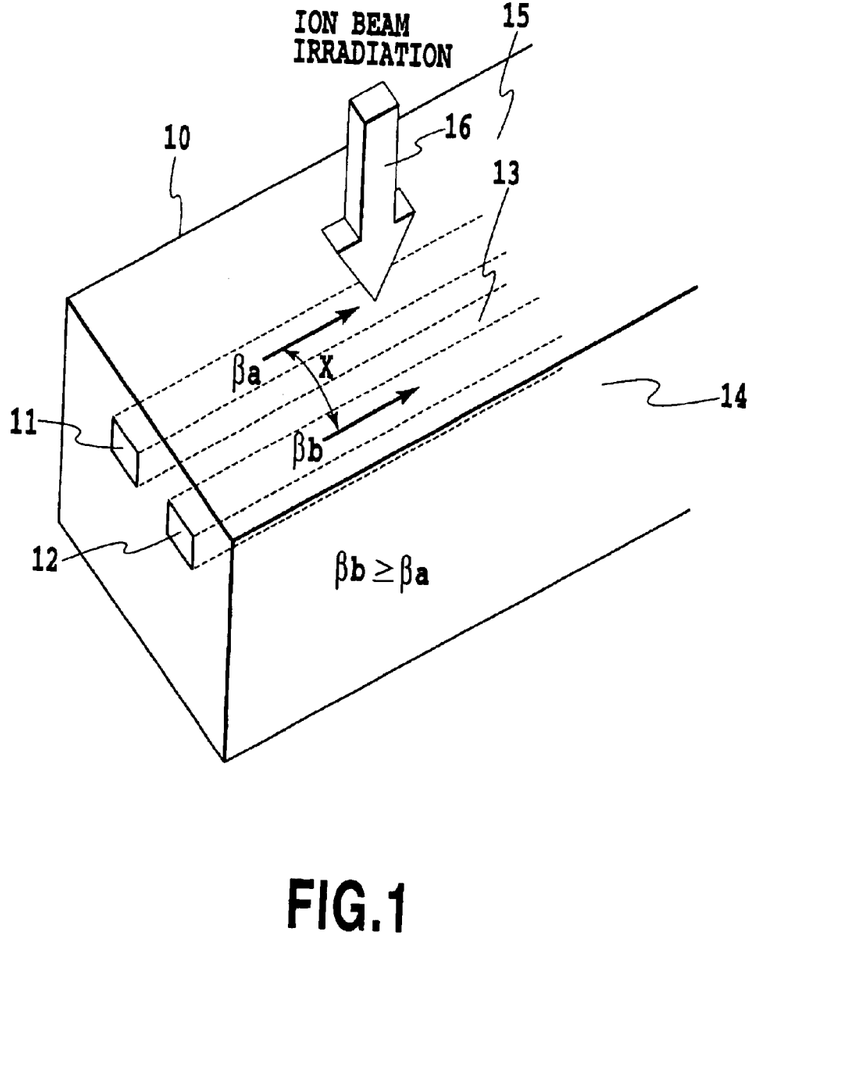
FIG. 1 is a schematic diagram showing a characteristic adjusting method of an optical waveguide coupler of an embodiment in accordance with the present invention.

FIG. 1 shows an outline of a characteristic adjusting method of an optical waveguide coupler of an embodiment in accordance with the present invention. In FIG. 1, the reference numeral 10 designates a coupling portion of an optical waveguide coupler. It will be described below what changes will occur in the coupling ratio when the refractive indices in various portions of the coupling portion 10 are varied.

First, the following cases that suppose an increase in the refractive index are considered.

(a) A case where the refractive index of a core of one of the a first waveguide 11 and a second waveguide 12 is increased.

(b) A case where the refractive indices of the cores of the two waveguides 11 and 12 are increased.

(c) A case where the refractive index of a cladding 13 sandwiched by the cores of the two waveguides 11 and 12 is increased.

(d) A case where the refractive indices of claddings 14 and 15 not sandwiched by the cores of the two waveguides are increased.

(a) When the refractive index of the core of the second waveguide 12 is increased, the propagation constant $\beta_b$ is also increased. Thus, the value $\delta$ also increases as seen from the foregoing equation (4). In this case, because of the increase in the refractive index of the core of the second waveguide 12, the confinement of light in the second waveguide 12 becomes strong and the coupling coefficient x decreases. These will vary the value $\beta_c$ of the foregoing equation (3) and the value F in the foregoing equation (5). Accordingly, the output powers $P_I$ and $P_{II}$ change, which means that the coupling ratio varies.

When the refractive index of the core of the first waveguide 11 is increased, the propagation constant $\beta_a$ is also increased. Thus, the value $\delta$ decreases. In this case, the confinement of light in the core of the first waveguide 11 becomes strong. Thus, the coupling coefficient x decreases. As a result, the value $\beta_c$ and the value F vary, thereby varying the coupling ratio.

(b) When the refractive indices of the cores of the two waveguides 11 and 12 are increased by about the same amount, the propagation constants of both the waveguides are also increased by about the same amount. Thus the variation in the value $\delta$ is small from the foregoing equation (4). However, since the confinement of light in both the cores of the waveguides 11 and 12 becomes strong, the coupling coefficient x reduces, causing changes in the value $\beta_c$ and the value F, and the variation in the coupling ratio.

(c) When the refractive index of the cladding 13 sandwiched by the cores of the two waveguides 11 and 12 is increased, the confinement of light in the cores of the waveguides becomes weak, and the coupling coefficient x increases, thereby causing changes in the value $\beta_c$ and the value F, and the variation in the coupling ratio.

(d) When the refractive indices of the claddings 14 and 15 not sandwiched by the cores of the two waveguides 11 and 12 are increased, the confinement of light at the outside edges of the cores of the waveguides becomes weak, and the ooze of light to the claddings facing to the outside edges of the cores, i.e., the claddings 14 and 15, increases. Thus, the ooze of light to the portion sandwiched by the cores of the waveguides decreases, thereby reducing the coupling coefficient x and causing the variations in the value $\beta_c$ and the value F. Accordingly, the coupling ratio varies.

In contrast, when the refractive indices are decreased, the value $\delta$ and coupling coefficient x exhibit the behavior opposite to that described above, thereby changing the value $\beta_c$ and the value F. As a result, the coupling ratio varies.

Whether the variations in the refractive indices in the various portions bring about an increase or a decrease in the coupling ratio depends on the conditions of the coupler before the refractive index variation. The following description is made by way of example where the value $\delta$ is fixed (=0), although the coupling coefficient x varies because of the variation in the refractive index of the coupling portion 10.

If the length z of the coupling portion 33 is shorter than $\pi/2\beta_c$, that is, if $0<\beta_c z<\pi/2$, the output power $P_{II}$ increases once at least with an increase of the coupling coefficient x because the value $\beta_c$ increases as well. However, the output power $P_{II}$ turns to decrease when the value $\beta_c z$ exceeds $\pi/2$.

On the other hand, when the length z of the coupling portion 33 is greater than $\pi/2\beta_c$, even if the coupling coefficient x increases, the output power $P_{II}$ does not increase and reduces monotonically until the value $\beta_c z$ exceeds $\pi$.

In this way, it is understandable that varying the refractive index of the coupling portion of the optical waveguide coupler 10 can vary the coupling ratio of the coupler.

Therefore using this phenomenon enables the adjustment of the coupling ratio of the coupler fabricated. In this case, the desired adjustment can be achieved by selecting an appropriate portion of the coupler to be subjected to the refractive index variation depending on the characteristics of the coupler before the adjustment as above mentioned. The appropriate portion to be selected for the refractive index variation have need to be selected by a combination of a plurality of places described above or only one of them depending on the characteristics of the coupler.

Next, the degree of the variation in the refractive index necessary for the adjustment of the coupler will be described by way of example of increasing the refractive index.

Generally, the difference between the refractive index of the core and that of the cladding in an optical waveguide for an optical communication is about 1%. Accordingly, it is enough for the adjustment of the coupler characteristics, which is carried out by increasing the refractive index of the cladding 13 sandwiched between the cores of the two waveguides 11 and 12, to be able to increase the refractive index of the cladding 13 by about 1%.

If the refractive index of the cladding 13 sandwiched by the cores of the two waveguides 11 and 12 is increased by about 1% to achieve same refractive index as that of the core of the waveguides 11 and 12, the light in this region is not confined in the core any longer. In other words, it is nearly equivalent to the condition in which the two waveguides are brought into contact. As is seen from this, increasing the refractive index of the cladding 13 sandwiched by the cores of the two waveguides 11 and 12 is equivalent to make the two waveguides closer to each other. The increasing amount of the refractive index of the cladding required here is the difference between the refractive indices of the core and cladding at the maximum, that is, about 1%.

When increasing the refractive indices of the claddings 14 and 15 not sandwiched by the cores of the two waveguides 11 and 12, it is enough for the refractive index to be increased by about the same amount as the difference of the refractive indices between the core and the claddings at the maximum. If the refractive indices of the claddings 14 and 15 not sandwiched by the cores of the two waveguides are increased too much so that it exceeds the refractive indices of the cores, the light does not propagate through the cores, but escapes from the cores to the claddings.

When adjusting the coupler characteristics by increasing the refractive indices of the waveguide cores, one of the large factors for modifying the coupler characteristics is the variation in the value $\delta$. As shown in the foregoing equations (3) and (5), the coupler characteristics vary when the value $\delta$ varies largely with respect to the coupling coefficient x. Usually, the magnitude of the coupling coefficient x is less than one thousandth of the propagation constant $\beta_a$ or $\beta_b$. Accordingly the coupler characteristics can be modified by varying the value $\delta$ in a range of around one thousandth of the propagation constant $\beta_a$ or $\beta_b$. In addition, as seen from the foregoing equation (4), the variation in the value $\delta$ is equal to the variation in the propagation constant $\beta_a$ or $\beta_b$.

Thus, varying the propagation constant $\beta_a$ or $\beta_b$ by about 0.1% enables the sufficient adjustment of the coupler characteristics. Since the propagation constants $\beta_a$ and $\beta_b$ are nearly proportional to the refractive index of the waveguide core, about a 0.1% increase in the refractive index of the core enables the coupler characteristic adjustment.

Therefore the inventor of the present invention discovers a method of achieving the refractive index variation by ion implantation as a means of implementing the coupler characteristic adjustment using the refractive index variation.

As a method of inducing the refractive index variation in the optical waveguide, ultraviolet-photon irradiation or powerful infrared-photon (heat ray) irradiation is conceivable. However, they can bring about the refractive index variation in only optical waveguides made from very special materials with increased photosensitivity. In addition, an ultraviolet-photon induced refractive index increase in the pure silica glass most popular as a material of the optical waveguide is about 0.001%. Thus it cannot achieve the refractive index variation necessary for the coupler characteristic adjustment discussed above.

On the other hand, when accelerated ions are implanted into any glass that is predominantly composed of silica glass, the ions induce densification in the location in the glass in which they come to rest, thereby increasing the refractive index of about 1% at the maximum (M. Verhaegen et al. Nucl. Instrum. Methods Phys. Res. B, Vol. 106, p. 438, 1995). Accordingly, the ion implantation is an effective method of implementing the foregoing objective of the present invention.

Implanting an ionic species that causes chemical bonds with the silica glass and brings about the refractive index variation will further increase the efficiency of the refractive index modification. As the ionic species that increases the refractive index of the silica glass by chemical reaction, there are Ge ions, P ions, Ti ions and the like, for example. In contrast, as the ionic species that reduces the refractive index of the silica glass by chemical reaction, there are B ions, F ions and the like.

As for the optical waveguide coupler composed of the optical waveguides whose coupling portion is made from a semiconductor material such as GaAs, InP and Si, from a ferroelectric material such as $LiNbO_3$ or from a magnetic material such as $Y_3Fe_5O_{12}$, ion implantation causes density reduction because of amorphization, variations of dielectric constant, chemical bonds with the implanted ions and the like, thereby varying the refractive index. Accordingly, the ion implantation is applicable to the characteristic adjustment of the coupler made from these materials. In addition, the present scheme is applicable to the optical waveguide couplers made from materials other than the foregoing materials, as long as they are optical waveguide couplers made from materials in which the ion implantation can induce the refractive index variation.

Ion Implantation for Coupler Characteristic Adjustment

As described above, the refractive index variation must be induced in the core of the waveguide 11 or 12, or in the cladding 13 or claddings 14 or 15 in the immediate neighborhood of the cores of the waveguides in the coupling portion 10 of the coupler.

The coupling portion is usually embedded in the cladding as indicated by the reference numeral 44 in FIG. 4E. The thickness of a common cladding is about 20 $\mu$m in a planar optical waveguide, and about 60 $\mu$m in an optical fiber. Consequently, to achieve the coupling ratio adjustment by the ion implantation, it is necessary for the ions to pass through the cladding of a few tens of micrometers thick and to reach the coupling portion or the cladding close to the coupling portion.

Accordingly, when the cladding thickness at the coupling portion exceeds 10 $\mu$m in the present invention, the ions to be implanted are those of atoms whose atomic number is 36 or less, for example. Since these ions can achieve a projected range greater than 10 $\mu$m by acceleration energy less than 50 MeV, they have an advantage of being able to reduce the acceleration energy for causing the ions to arrive at the coupling portion. When the cladding is 10 $\mu$m thick or less, all the ions accelerable by an existing accelerator are applicable.

Selection Method of Acceleration Energy

There are two methods of selecting the acceleration energy for causing the ions to arrive at the neighborhood of the coupling portion. A first method fixes the acceleration energy at a specified value during the coupler characteristic adjustment, and selects the acceleration energy such that the implanted ions arrive at the waveguide cores of the coupling portion, or at the cladding near the coupling portion.

For example, when hydrogen ions are implanted into the center of the cores to adjust the coupler formed in a planar optical waveguide including 9 $\mu$m thick Ge doped silica glass cores that are embedded under a 20 $\mu$m thick silica glass cladding, that is, to drive the hydrogen ions to the depth of 24.5 $\mu$m, it is enough for the hydrogen ions to be implanted at 1.35 MeV. In this case, the longitudinal thickness of the portion in which the ion implantation induces an increase in the refractive index is about 2 $\mu$m so that the refractive index increase cannot be induced in the entire cores of 9 $\mu$m thick. Thus, the adjustment range by means of the coupling ratio adjustment reduces. However, the fixed acceleration energy enables savings in manpower of varying the acceleration energy, thereby making it possible to save the time for the coupler characteristic adjustment.

Another method varies the acceleration energy such that the ions are implanted into the entire optical waveguide core. For example, to induce the refractive index increase in the entire longitudinal direction of the cores by implanting the hydrogen ions to the entire core region of the planar optical waveguide including a 20 $\mu$m thick silica glass cladding and 9 $\mu$m thick Ge-doped silica glass cores, it is enough to implant hydrogen ions with the acceleration energy of 1.35±0.15 MeV. Although it must take trouble to vary the acceleration energy, this method can make the coupling ratio adjustment range wider than the method that fixes the acceleration energy.

Although the foregoing two methods are described by way of example in which ions are implanted into the cores, similar selection is possible when ions are implanted into the claddings near the cores.

In this case, the region where the ions are to be implanted is one or both of the waveguide cores in the coupling portion or the claddings surrounding the cores in the coupling portion. As to the location to be selected in the region, it varies depending on the desired coupling characteristics as in the foregoing examples. However, it is not preferable that the ions are implanted to a region other than the selected location.

For example, when selecting the 9 $\mu$m wide cladding region sandwiched by the cores in the coupler as the region to which the ions are irradiated, it is necessary to mask the incoming ions or to converge the ion beam with a diameter less than 9 $\mu$m so that the ions are irradiated not to the cores and the external claddings, but only to the cladding sandwiched by the cores. Although it is not so difficult for the latest technique to focus the ions to less than 9 $\mu$m, since it requires expensive device, the method of using a mask is low-priced and easier to carry out the irradiation.

Here, the property of the ions must be considered that because of the interaction with the atoms in the substance, they scatter and spread when implanted into a substance. For example, when 1.35 MeV hydrogen ions are implanted into silica glass, they come to rest at a depth of about 24.5 $\mu$m with distribution of about 2 $\mu$m wide in the lateral direction because of the scattering as shown in FIG. 2.

Figure 2:
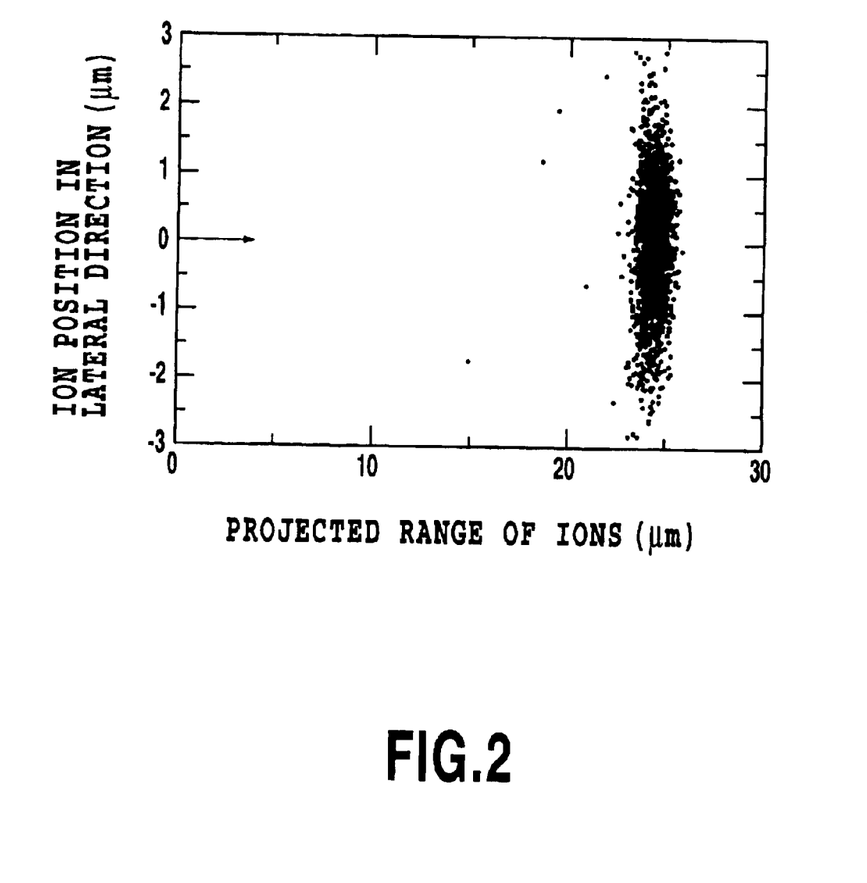
FIG. 2 is a graph illustrating a behavior of 1.35 MeV hydrogen ions that are implanted into silica glass and come to rest at the depth of about 24.5 $\mu$m with distribution of about 2 $\mu$m wide in the lateral direction because of scattering.

FIG. 2 shows that when the ions are incident normally onto the zero point of the longitudinal axis of FIG. 2, they have a distribution of about ±2 $\mu$m at the stop locations because of the scattering. Considering the distribution of the ions, it is necessary for a mask (not shown) to have a 5 $\mu$m wide slit narrowed by 4 $\mu$m from 9 $\mu$m, each 2 $\mu$m to both sides, in order to implant the ions 16 only to the 9 $\mu$m wide cladding 13 sandwiched by the cores 11 and 12 without irradiating the ions to the cores 11 and 12.

When He ions are used, it is enough for the He ions to be accelerated with 5.0 MeV to reach the depth of about 24.5 $\mu$m in the silica glass. In this case, the lateral distribution of about 1 $\mu$m occurs. Accordingly, it is enough for the mask (not shown) to have a slit narrower than the width of the region, to which the ions are to be implanted, by 2 $\mu$m, each 1 $\mu$m to both sides.

Although the ion implantation is described here by way of example in which the ions are implanted to the cladding region sandwiched by the cores here, the method is also applicable to the ion implantation to other regions. When the portion to be implanted is wide enough as when the ions are implanted to the entire region around the coupling portion, it is not necessary to use a mask.

Ion Implantation Dose

The ion implantation brings about a densification in the silica glass, resulting in the increase in the refractive index of about 1% at the maximum. However, the implantation dose of ions to achieve the desired refractive index depends on the ionic species. In addition, the maximum variation in the refractive index and the variation per unit implantation dose also depend on a fabrication process of the silica glass or on the type and amount of dopant of the glass.

To achieve about 1% refractive index variation by the hydrogen ion implantation in pure silica glass called synthesized silica, an implantation dose of ions on the order of $10^{16}/cm^2$ is required. The implantation dose of ions can be reduced as the ions become heavier. For example, it is enough for He ions to be about one ninth of the hydrogen, for nitrogen ions to be about one 70th of the hydrogen (see, Makoto Fujimaki et al. "Ion-implantation-induced densification in silica-based glass for fabrication of optical fiber gratings" Journal of Applied Physics, Vol. 88, No. 10, pp. 5534–5537, Nov. 15, 2000).

When achieving the refractive index variation by the chemical bonds between the implanted ions and the waveguide materials, the value of the variation in refractive index is manifold depending of the waveguide materials and the implanted ion species. For example, as for the silica glass used as the waveguide material, relationships between dopants added to the glass and the refractive index variation are described a lot in a data book by O. V. Mazurin, M. V. Streltsina, and T. P. Shvaiko-Shvaikovskaya, "Physical Sciences Data 15 Hand Book of Glass Data", Part A silica glass and binary silicate glasses, published by Elsevier, 1983. As for the semiconductor materials, ferroelectric materials and magnetic materials, an example is described on p. 185 of Hiroshi Nisihara, Masamitsu Haruna, and Toshiaki Suhara, "Optical Integrated Circuit (revised and enlarged edition)", published by Ohmsha, Mar. 25, 1998. The refractive index variation by the chemical bonds can be induced by implanting ions of atoms that will cause the refractive index variation by the chemical bonds.

The foregoing implantation dose of ions is for the maximum refractive index variation. The actual ion implantation dose depends on the coupling ratio to be adjusted. When the dose of the ions to be implanted is unknown, the ions can be implanted with monitoring the characteristic of the coupler. It is obvious that when the required refractive index variation is known, the amount of ions that meets the requirement can be implanted.

(Other Embodiments)

As a modification of the foregoing embodiments in accordance with the present invention, the coupling can be implemented as follows. First, two waveguides are partially placed close together at a distance that will prevent a coupling, thereby maintaining the coupling coefficient x=0. Second, the region is subjected to the ion implantation to increase the coupling coefficient x to bring about the coupling. Thus, an optical waveguide coupler can be created in the two waveguides that had no coupling portion.

Although the foregoing description is made by way of example in which the characteristics of the coupler formed in the planar optical waveguides are adjusted by the coupler characteristic adjusting method based on the ion implantation, this is not essential. The adjustment method in accordance with the present invention is applicable not only to the coupler formed in a planar optical waveguide, but also to the coupler made of optical fibers, which will be obvious for those skilled in the art.

Furthermore, although the foregoing description is made by way of example where the coupling direction is identical, that is, both the propagation constants $\beta_a$ and $\beta_b$ are positive, this is not essential. For example, the adjustment method in accordance with the present invention is applicable to the coupler in which the coupling direction is opposite, that is, one of the two propagation constants $\beta_a$ and $\beta_b$ is negative.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

What is claimed is:

1. A characteristic adjusting method of an optical waveguide coupler comprising the steps of:

generating accelerated ions; and adjusting a coupling ratio of the optical waveguide coupler by implanting the accelerated ions into a coupling portion of the optical waveguide coupler to vary refractive index of the coupling portion.

2. The characteristic adjusting method of an optical waveguide coupler as claimed in claim 1, further comprising the step of selecting, as a region in which the refractive index is varied by the ion implantation, at least one of components constituting the coupling portion that is composed of optical waveguide cores, a cladding sandwiched by the two optical waveguide cores and a cladding not sandwiched by the two optical waveguide cores.

3. The characteristic adjusting method of an optical waveguide coupler as claimed in claim 2, wherein the ion implantation is carried out with preventing the ions from being implanted to regions other than a selected region by means of using a mask or focusing the ions.

4. The characteristic adjusting method of an optical waveguide coupler as claimed in claim 2, wherein the ion implantation is carried out with preventing the ions from being implanted to regions other than a selected region by means of using a mask or focusing the ions, and wherein one of the width of a slit of the mask and the size of ion focusing is determined considering a phenomenon that when the ions are implanted into a substance, they scatter and spread because of interaction with atoms in the substance.

5. The characteristic adjusting method of an optical waveguide coupler as claimed in claim 1, wherein the ion implantation is carried out by implanting ions of atoms whose atomic number is equal to or less than 36.

6. The characteristic adjusting method of an optical waveguide coupler as claimed in claim 1, wherein the ion implantation is carried out by implanting an ionic species including at least one of Ge ions, P ions, Ti ions, B ions and F ions that cause chemical bonds with silica glass resulting in the refractive index variation.

7. The characteristic adjusting method of an optical waveguide coupler as claimed in claim 1, wherein the optical waveguide coupler has the coupling portion composed of one of a semiconductor material, a ferroelectric material and a ferromagnetic material, and wherein the ion implantation causes one of a density reduction of the material due to amorphization, a variation in a dielectric constant of the material and chemical bonds of the implanted ions with atoms in the material, resulting in the refractive index variation in a location to which the ions are implanted.

8. The characteristic adjusting method of an optical waveguide coupler as claimed in claim 1, wherein acceleration energy of the ions is fixed during the adjustment of the coupling ratio of the optical waveguide coupler.

9. The characteristic adjusting method of an optical waveguide coupler as claimed in claim 1, wherein acceleration energy of the ions is varied such that the ions are implanted to an entire longitudinal direction of the coupling portion of the optical waveguide coupler.

10. The characteristic adjusting method of an optical waveguide coupler as claimed in claim 1, wherein the coupling ratio is adjusted by placing two optical waveguides close to each other in part at a distance that prevents a coupling, that is, by setting a coupling coefficient at zero, and by increasing the coupling coefficient by implanting the ions to the portion where the two optical waveguides are close to each other.

11. The characteristic adjusting method of an optical waveguide coupler as claimed in claim 1, wherein the optical waveguide coupler consists of one of a coupler formed in a planar optical waveguide and a coupler composed of optical fibers.

12. An optical waveguide coupler comprising a coupling portion whose coupling ratio is adjusted by varying a refractive index of the coupling portion by implanting accelerated ions into the coupling portion of the optical waveguide coupler.

13. The optical waveguide coupler as claimed in claim 12, wherein the coupling ratio of the coupling portion of the optical waveguide coupler is adjusted by selecting, as a region in which the refractive index is varied by the ion implantation, at least one of components constituting the coupling portion that is composed of optical waveguide cores, a cladding sandwiched by the two optical waveguide cores and a cladding not sandwiched by the two optical waveguide cores.

14. The optical waveguide coupler as claimed in claim 13, wherein the coupling ratio of the coupling portion of the optical waveguide coupler is adjusted by carrying out the ion implantation with preventing the ions from being implanted to regions other than a selected region by means of using a mask or focusing the ions.

15. The optical waveguide coupler as claimed in claim 13, wherein the coupling ratio of the coupling portion of the optical waveguide coupler is adjusted by carrying out the ion implantation with preventing the ions from being implanted to regions other than a selected region by means of using a mask or focusing the ions, and wherein one of the width of a slit of the mask and the size of ion focusing is determined considering a phenomenon that when the ions are implanted into a substance, they scatter and spread because of interaction with atoms in the substance.

16. The optical waveguide coupler as claimed in claim 12, wherein the coupling ratio of the coupling portion of the optical waveguide coupler is adjusted by carrying out the ion implantation by implanting ions of atoms whose atomic number is equal to or less than 36.

17. The optical waveguide coupler as claimed in claim 12, wherein the coupling ratio of the coupling portion of the optical waveguide coupler is adjusted by carrying out the ion implantation by implanting an ionic species including at least one of Ge ions, P ions, Ti ions, B ions and F ions that cause chemical bonds with silica glass resulting in the refractive index variation.

18. The optical waveguide coupler as claimed in claim 12, wherein the optical waveguide coupler has the coupling portion composed of one of a semiconductor material, a ferroelectric material and a ferromagnetic material, and wherein the ion implantation causes one of a density reduction of the material due to amorphization, a variation in a dielectric constant of the material and chemical bonds of the implanted ions with atoms in the material, resulting in the refractive index variation in a location to which the ions are implanted.

19. The optical waveguide coupler as claimed in claim 12, wherein the coupling ratio of the coupling portion of the optical waveguide coupler is adjusted by placing two optical waveguides close to each other in part at a distance that prevents a coupling, that is, by setting a coupling coefficient at zero, and by increasing the coupling coefficient by implanting the ions to the portion where the two optical waveguides are close to each other.

20. The optical waveguide coupler as claimed in claim 12, wherein the optical waveguide coupler consists of one of a coupler formed in a planar optical waveguide and a coupler composed of optical fibers, and wherein the coupling ratio of the coupling portion is adjusted.

* * * * *

UNITED STATES PATENT AND TRADEMARK OFFICE
CERTIFICATE OF CORRECTION

PATENT NO. : 6,850,672 B2
DATED : February 1, 2005
INVENTOR(S) : Makoto Fujimaki It is certified that error appears in the above-identified patent and that said Letters Patent is hereby corrected as shown below:

Column 1,
Line 32, remove bold facing from the numeral "1"

Column 2,
Line 12, change "D-shaped" to -- a D-shape --
Line 13, after "contact" insert -- with --
Line 14, after "coupler" change "with" to -- while --

Column 6,
Line 24, change "6" to -- $\delta$ --

Column 8,
Line 35, change "device" to -- devices --

Signed and Sealed this

Fifth Day of July, 2005

JON W. DUDAS
*Director of the United States Patent and Trademark Office*